Dec. 31, 1929. W. PANNWITZ 1,741,734
DEVICE FOR TIGHTLY CLAMPING TOOLS IN HANDPIECES
Filed Feb. 9, 1928 2 Sheets-Sheet 1
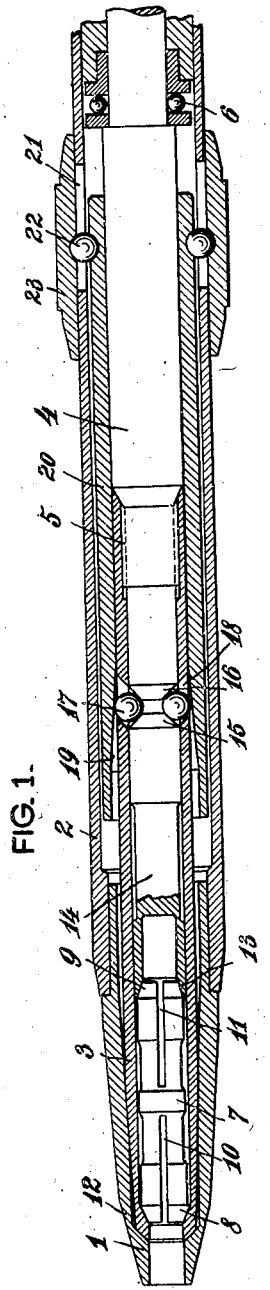
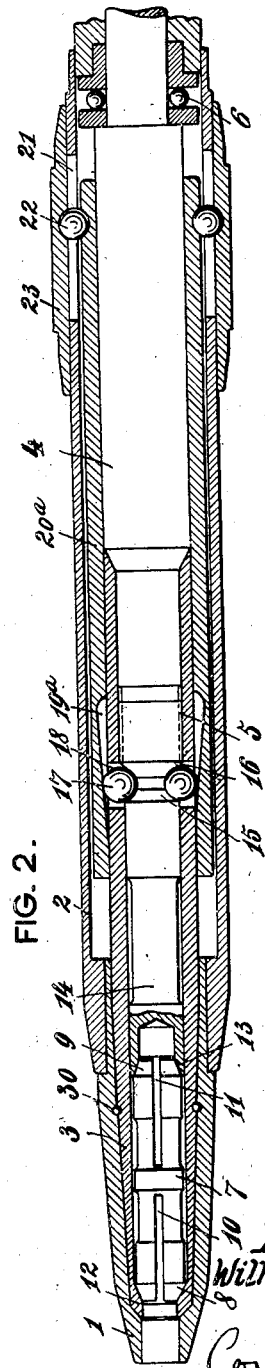
Inventor:
Wilhelm Pannwitz

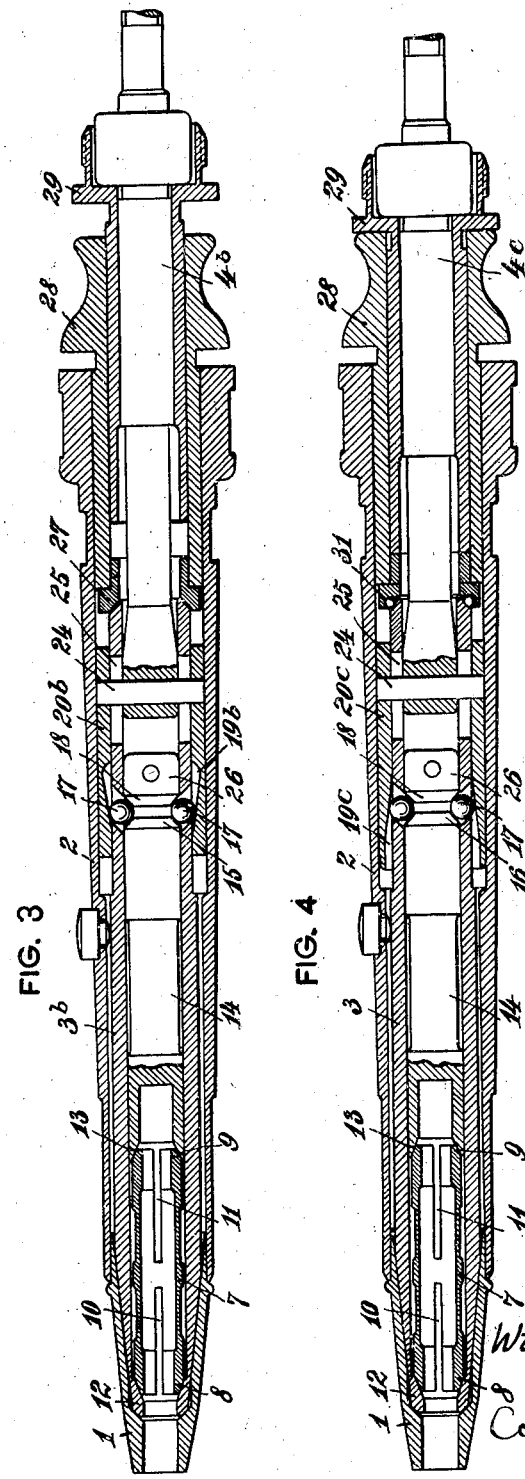

Patented Dec. 31, 1929

1,741,734

UNITED STATES PATENT OFFICE

WILHELM PANNWITZ, OF BERLIN-COPENICK, GERMANY, ASSIGNOR TO DEUTSCHE GOLD-
UND SILBER-SCHEIDEANSTALT, OF FRANKFORT-ON-THE-MAIN, GERMANY

DEVICE FOR TIGHTLY CLAMPING TOOLS IN HANDPIECES

Application filed February 9, 1923, Serial No. 253,161, and in Germany February 19, 1927.

The invention relates to a device for tightly clamping tools in hand pieces, as for example used in dentistry, and in which the clamping sleeve is clamped by axially moving a clamping member.

The invention essentially consists therein that the forward movement of the clamping member is effected by moving balls in a direction towards the axis of the hand piece. Preferably the movement is effected by a slider provided with inclined surfaces which is moved by an outer ring connected to the slider, for example by means of balls.

In comparison with the hand pieces of this type hitherto known, this construction has the advantage of a particularly simple manipulation of the hand piece when exchanging the tools.

Fig. 1 is a longitudinal sectional view of one form of my invention and Figs. 2, 3 and 4 are similar views showing three modifications of the invention.

In the form of construction illustrated in Figure 1 the tool holder 3, which is connected to the driving shaft 4 by a screw thread 5, is seated in the head piece 1 of the casing 2 of the hand piece. The driving shaft 4 is reduced in diameter and is mounted in a ball thrust bearing 6. The clamping sleeve 7 provided in the tool holder 3 is of conical construction at the ends 8 and 9 and is provided with longitudinal slots 10 and 11. The front cone 8 of the clamping sleeve is seated in an internal cone 12 of the tool holder 3 whilst the internal cone 13 of the clamping member 14 acts on the rear cone 9 of the clamping sleeve. The other end 15 of the clamping member 14 is conical and is located at a short distance from the end 16 of the driving shaft 14 which is also conical. Between the conical end 15 of the clamping member and the end 16 of the driving shaft balls 17 are located. These balls are retained in the cage 18 of the tool holder 3 and may be moved at right angles to the axis of the hand piece by longitudinal movement of a slider 20 which is provided with an inclined surface for engaging the balls. As the slider 20 is moved to the left, the balls 17 are moved in the direction of the axial center of the hand piece, thus pressing against the conical surfaces 15 and 16 and moving the clamping member 14 to the left. The slider 20 is connected to a ring 23 movable on the casing 2 of the hand piece by means of balls 22 projecting through slots 21 in the casing 2 of the hand piece.

In the form of construction illustrated the clamping sleeve 7 is in the clamping position so that a tool would be clamped in the hand piece. For releasing the clamping action for the purpose of releasing the tool the slider 23 is moved to the right. The balls 17 are thus released so that they can continue to move vertically from the axis of the hand piece. The clamping member 14 can then be moved in the direction of the longitudinal axis so that the clamping sleeve 7 is released from the two clamping cones 12 and 13 and the tool can be removed therefrom. For the purpose of clamping, the slider, after inserting the tool, is moved to the left, so that the balls 17, which bear against the stationary end 16 of the driving shaft, during their movement towards the axis of the hand piece move the clamping member 14 and therewith the clamping sleeve 7.

A double clamping action of the tool in the clamping sleeve 7 is not necessary. A single clamping cone on one end of the clamping sleeve suffices when suitably constructing the part cooperating with the other end of the clamping sleeve.

The form of construction illustrated in Figure 2, in which the same references are used for those parts not modified, only differs from the construction according to Figure 1 in the construction of the inclined surfaces which in this case rise in the direction towards the sliding ring 23 so that the clamping is effected by the movement of the slider towards the right and the unclamping by the movement of the slider to the left. Thus the slider 20ª is provided with inclined surfaces 19ª. For the purpose of omitting sliding bearings the head of the tool holder 3 is also mounted on balls 30.

In the form of construction shown in Figure 3 with substantially the same references as in Figure 1, the clamping is effected in the same manner as in the form of construction according to Figure 2. The operation of the slider 20 is effected, however, in different manner.

The driving shaft 4ᵇ is provided at its end with a pin 24 passing through slots 25 of the tool holder 3ᵇ and drives this and is connected firmly to the slider 20ᵇ. In the tool holder 3 there is provided a rigid thrust bearing 26, spaced from the end 15 of the clamping member, against which bear the balls 17. The rear end of the tool holder 3ᵇ is mounted in a sliding bearing 27 of a sliding part 28 with a guide member 29.

In the form of construction illustrated the hand piece is in the clamping position. For unclamping, the driving shaft 4ᵇ is telescoped into the hand piece and by means of the pin 24 engaging with the slots 25 of the tool holder 3ᵇ moves the slider 20ᵇ to the left. The balls 17 are then free, and move away from the axis of the hand piece, so that the clamping member 14 can be moved to the right whereby the clamping sleeve 7 is released and unclamped. For clamping, the driving shaft 4ᵇ with the guide piece 29 is withdrawn from the hand piece.

The form of construction illustrated in Figure 4 differs from the form of construction according to Figure 3 solely thereby that by reason of the different construction of the inclined surfaces 19ᶜ of the slider 20ᶜ the clamping takes place when the driving shaft 4ᶜ with the guide piece 29 is telescoped and the unclamping when it is withdrawn. Further the tool carrier is not provided with a sliding bearing 27, but is mounted in a ball bearing 31. It is also possible in this case to provide a ball bearing for the tool holder in the head as in Figure 2.

In the forms of construction with rotary sliders according to Figures 3 and 4 the balls could be replaced by other rolling bodies, for example rollers.

I claim:

1. In a clamping device for hand pieces, a clamping sleeve, an axially movable clamping member acting on said clamping sleeve, balls acting on said clamping member, and means to move said balls towards the axis of the hand piece whereby said clamping member is moved axially.

2. In a clamping device for hand pieces a clamping sleeve, an axially movable clamping member acting on said clamping sleeve, balls acting on said clamping member, a slider with downwardly inclined surfaces acting on said balls, and means to move said slider in the diretcion of the axis in the casing of the hand piece whereby the balls are moved towards the axis of the hand piece.

3. In a clamping device for hand piece a tool holder in the casing of the hand piece, a clamping sleeve in said tool holder, axial slots in said clamping sleeve, a front cone on said clamping sleeve and seated in an internal cone of said tool holder, a back cone on said clamping sleeve, a clamping member slidable in said tool holder and carrying an internal cone acting on said back cone of said clamping sleeve, a back cone on said clamping member arranged at a short distance from the conical end of the driving shaft connected to said tool holder, balls arranged in cages formed by said tool holder and the conical ends of said clamping member and said driving shaft, a slider surrounding said tool holder in said casing of the hand piece, inclined surfaces on said slider acting on said balls and means to move said slider axially in the casing of the hand piece.

In testimony whereof I affix my signature.

WILHELM PANNWITZ.